United States Patent [19]

Yahagi et al.

[11] Patent Number: 5,411,274
[45] Date of Patent: May 2, 1995

[54] VORTEX GASKET FOR AUTOMATIVE EXHAUST SYSTEM

[75] Inventors: Hideo Yahagi, Susono; Masahiko Takaoka, Sanda; Shingo Hoshikawa, Sanda; Takeshi Miyoshi, Sanda; Keiji Okada, Sanda, all of Japan

[73] Assignees: Toyota Jidosha Kabushiki Kaisha, Aichi; Nippon Pillar Packing Co., Ltd., Osaka, both of Japan

[21] Appl. No.: 60,069

[22] Filed: May 13, 1993

[30] Foreign Application Priority Data

May 18, 1992 [JP] Japan .................... 4-124709

[51] Int. Cl.⁶ ............................................ F16J 9/04
[52] U.S. Cl. .................................. 277/203; 277/204; 277/207 A
[58] Field of Search ............... 277/203, 204, 207 A, 277/235 A, 115, 117, 168, 190

[56] References Cited

U.S. PATENT DOCUMENTS

| | | | |
|---|---|---|---|
| 1,952,339 | 3/1934 | Solenberger | 277/204 X |
| 2,827,320 | 3/1958 | Kane | 277/204 X |
| 3,926,445 | 12/1975 | Farnam | |
| 4,462,603 | 7/1984 | Usher et al. | 277/204 X |
| 5,161,807 | 11/1992 | Allen et al. | 277/204 X |

FOREIGN PATENT DOCUMENTS 3706094.9 10/1987 Germany .
60-161751 10/1985 Japan .
3-93654 9/1991 Japan .

OTHER PUBLICATIONS

"Metal Gaskets for Raised-Face Pipe Flanges and Flanged Connections (Double-Jacketed Corrugated and Spiral-wound)"; API std. 601, 7th ed., Mar. 1988; section 3.

*Primary Examiner*—Daniel G. DePumpo
*Attorney, Agent, or Firm*—Griffin, Butler, Whisenhunt & Kurtossy

[57] ABSTRACT

A vortex gasket for automotive exhaust system, preferably used with a special flange having a conical seal surface, is formed by spirally overlaying a metal hoop (2) of flat strip, and an inorganic filler (3) of tape form, and annularly spot welding a winding start portion (2a) and a winding end portion (2b) of the hoop (2) to itself. The tape form of the inorganic filler is wider than the flat strip of the metal hoop so that edges of the inorganic filler form seal contact surfaces spaced beyond edges of the metal hoop. When an external force is applied in the axial direction, slipping occurs between the hoop (2) and the filler (3), and the gasket is telescopically deformed in the axial direction, so that the seal contact surfaces 1a, 1b, at sides of the gasket, are formed in a conical shape.

4 Claims, 4 Drawing Sheets

VORTEX GASKET FOR AUTOMATIVE EXHAUST SYSTEM

BACKGROUND OF THE INVENTION

The present invention relates to a vortex gasket to be placed between flange faces having conical surfaces, in a flange joint structure of automotive exhaust systems.

Generally, in a flange joint structure of automotive exhaust system, a flat grooved flange, orthogonal to the tube axial line, is tightened, with a vortex gasket placed in the groove thereof, but this flat flange is manufactured separately from the exhaust manifold, and other elements, and welded thereon later, which causes problems in weight and manufacturing cost.

Recently, therefore, in automotive exhaust systems, by bulging tubes at or near ends thereof, flanges have been integrally formed, and it has been attempted to reduce the weight of the exhaust systems while reducing manufacturing costs. In such a flange (hereinafter called a special flange), the seal surface, as the crimping surface of the seal member, is not a flat surface orthogonal to the tube axial line, as in the case of the above flat plate flange, but forms a conical shape, inclined to the tube axial line.

Incidentally, a traditional vortex gasket is formed by integrally overlaying spirally a metal hoop, whose sectional shape in width has a waveform, and an inorganic filler in a tape form. Such a gasket excels in the property of compressibility and recovery, among other things, because of the presence of the metal hoop, and is ideal as the seal between flanges; but, structurally, it cannot be used in the special flange as mentioned above. More specifically, this vortex gasket has the overlaid annular layers of hoop and filler engaged with each other in waveform, and is extremely high in rigidity against deformation in an axial direction; hence it is not easy to deform gasket end surfaces (or side surfaces) contacting flange seal surfaces (hereinafter called seal face contact surfaces) from a flat state, orthogonal in the axial direction. Therefore, when placed between the special flanges, the seal face contact surfaces cannot be deformed in a conical shape corresponding to the flange seal surfaces, and if an attempt is made to deform by force, abnormal deformation or gaps may be caused around the filler, so that further favorable seal function cannot be exhibited. Of course, if such a vortex gasket were fabricated and formed preliminarily in a shape corresponding to the seal surface shape, occurrence of such abnormal deformation and gaps cannot be avoided, and favorable seal function cannot be obtained. If follows from these points, that the traditional vortex gasket cannot be used, by any means, with the special flanges having a conical seal surfaces.

It may be considered to use something that can be easily deformed and formed into a shape corresponding to the seal surface of the seal face contact surface as the seal member to be placed between such special flanges. For example, a graphite material covered with metal mesh and pressed and formed into a desired shape could be used, but such a seal member is inferior to a vortex gasket, as a matter of course, in properties of compressibility and recovery, among others, so that a tightening surface pressure cannot be raised. Further, it may be broken upon removal after use. Or, it is higher in cost, and hence not practical.

It is hence a primary object of the invention to provide a vortex gasket maintaining intrinsic excellent functions for providing a seal between flanges, preferably being usable in special flanges having a conical seal surface and being applicable, following recent trends, for special flanges in automotive exhaust systems.

SUMMARY

This object is achieved by spirally and integrally overlaying a metal hoop of a flat strip, and a filler of a slightly broader tape, in a state deformable in an axial direction (axis A) so that gasket end (or side) faces may be conically shaped. Since the hoop and filler are both flat plates, straight in the axial direction, by applying an external force in the axial direction, slipping occurs between the two to cause deformation in the axial direction, so that seal face contact surfaces at the gasket end faces may be formed into a desired conical shape. Therefore, the seal face contact surfaces may be properly fitted to flange seal surfaces having a conical shape, so that it may be preferably used as the seal between special flanges.

Other objects, features, aspects and advantages of the present invention will become apparent upon consideration of the following detailed description of the invention when taken in conjunction with the accompanying drawings.

DESCRIPTION OF THE PREFERRED EMBODIMENT

Referring now to FIG. 1A to FIG. 4, the invention is described in detail below according to one embodiment thereof.

Figure 1A:
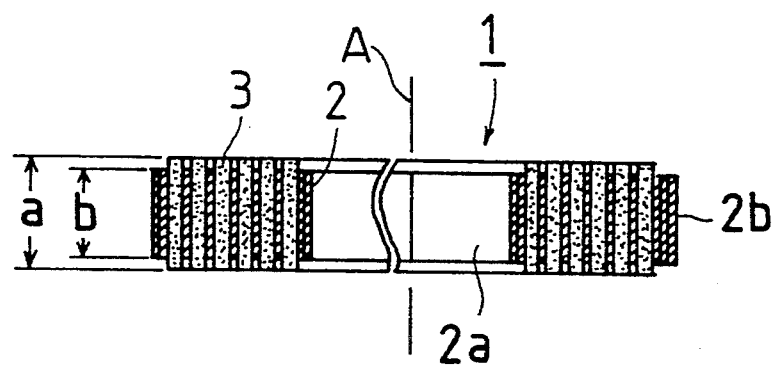
FIG. 1A is sectional view (with the section taken along line I—I in FIG. 2) showing an embodiment of a vortex gasket for an automotive exhaust system according to the invention, exhibiting a state before deformation.
Figure 2:
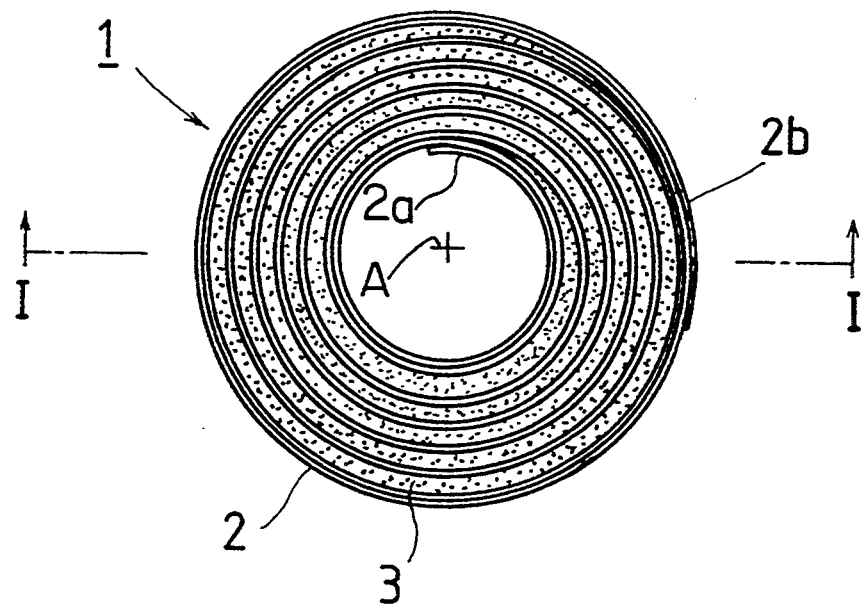
FIG. 2 is a plan view of the same gasket.

A vortex gasket 1 of the embodiment is formed, as shown in FIG. 1A and FIG. 2, by spirally overlaying a metal hoop 2 of flat strip, and an inorganic filler 3 of tape form, and spot welding a winding start portion 2a and a winding end portion 2b of the hoop 2 at plural positions.

The hoop 2 is made of thin metal sheet such as stainless steel, and the filler 3 is composed of inorganic paper, flexible graphite sheet, mica sheet or the like, having ceramic fibers or glass fibers blended with inorganic powder such as mica and talc. Preferred ceramic fibers are amino-silicate fibers. The materials of the hoop 2 and filler 3 are properly selected depending on sealing conditions such as properties of the fluid to be sealed.

Figure 1B:
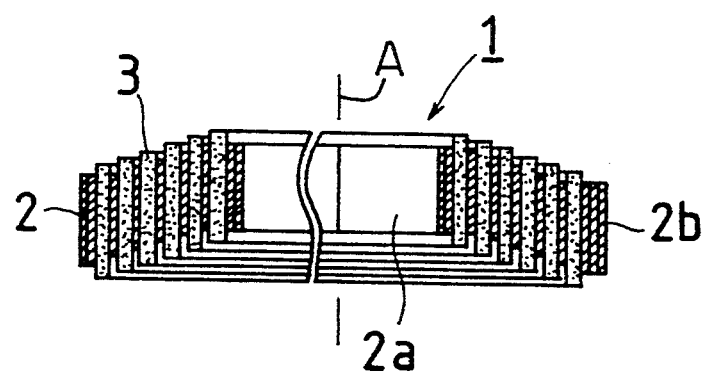
FIG. 1B is a sectional view similar to FIG. 1A showing the state after its deformation.

The width a of the filler 3 is set, as shown in FIG. 1B, to be slightly broader than the width b of the hoop 2 so that the hoop 2 may not be exposed in seal face contact surfaces 1a, 1b at the gasket end faces when it is deformed telescopically depending on the flange shape. If the projection (bulging) of the filler 3 from the hoop 2 is too small, the hoop 2 may contact with the flange seal surface, and the hoop contact portion may form an escape way, or, to the contrary, if the projection of the filler 2 is excessive, the bulging part of the filler 3 may be knocked off due to sealed fluid pressure or high temperature vibration or the like, and, in any event, favorable seal function cannot be expected. These dimensions a and b have been determined, in consideration of such points, and generally it is desired to make such determinations depending on sealing conditions (such as the shape of the flange seal surface), to be in a range of $1 < a/b \geqq 1.5$.

A thusly composed vortex gasket can exhibit, as estimated from its structure, the same seal functions as the traditional vortex gasket mentioned above, and moreover, since the hoop 2 and filler 3 are both flat plates which are straight in the axial direction, by applying an external force in the axial direction, slipping occurs between 2 and 3, and a telescopic deformation in the axial direction occurs as shown in FIG. 1B, and the seal face contact surfaces $1a$, $1b$ may be formed in an arbitrary conical shape.

Figure 3:
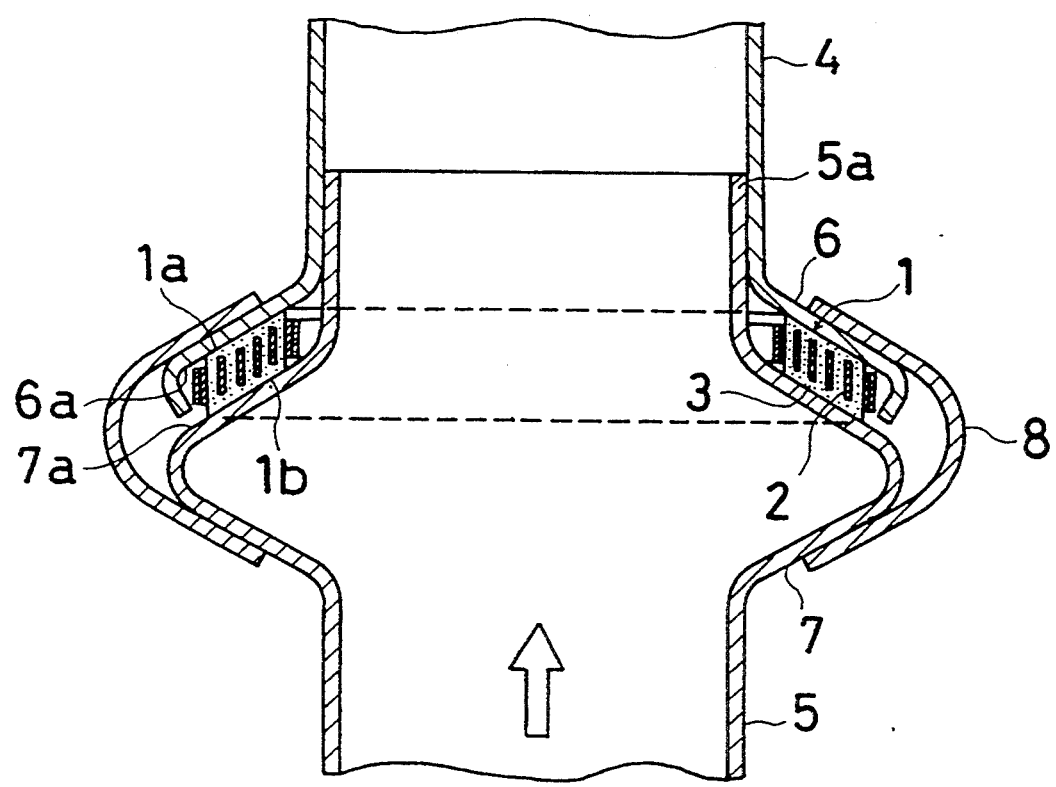
FIG. 3 is a longitudinal sectional view showing an example of a flange joint structure in an automotive exhaust system using the same gasket.

Therefore, for example as shown in FIG. 3, in a flange joint structure in which flange seal surfaces $6a$, $7a$ are in conical shape, it may function favorably as the seal between the flanges.

That is, the joint structure shown in FIG. 3 is provided in an automotive exhaust system, and with a front end $5a$ of an upstream exhaust pipe 5 fitted to a downstream exhaust pipe 4, by tightening a flanges 6, 7 with a clamp member 8, the exhaust pipes 4, 5 are connected together. One flange 6 is formed in one body by dilating and deforming the pipe end portion of the downstream exhaust pipe 4, and possesses a conical seal surface $6a$. The other flange 7 is formed as one piece by bulging and deforming the vicinity of the pipe end of the upstream exhaust pipe 5, and possesses a seal surface $7a$ in the same shape as the seal surface $6a$.

Figure 4:
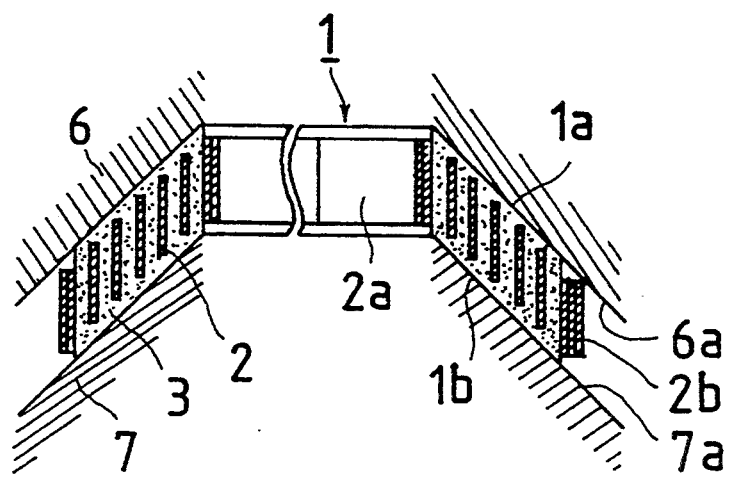
FIG. 4 is a segmented detailed sectional view magnifying essential parts in FIG. 3.

In such a flange structure, when the vortex gasket 1, made in a flat form as shown in FIG. 1A, is placed between the seal surfaces $6a$ and $7a$ and the flanges and 7 are tightened together, a slipping deformation is caused in the axial direction by the tightening force, and the seal face contact surfaces $1a$, $1b$ are changed into a shape corresponding to the seal surfaces $6a$, $7a$, and are, in the end, brought entirely into contact with the seal surfaces $6a$, $7a$ (see FIG. 3 and FIG. 4). Thus, since the deformation property, and fitting of each of the seal face contact surfaces $1a$, $1b$ with the seal surfaces $6a$, $7a$, are very high, a favorable seal function on the special flanges 6, 7 is attained.

Meanwhile, the vortex gasket 1 may be used in the flat state as manufactured as described above, and, if necessary, the seal face contact surfaces $1a$, $1b$ may be preliminarily formed artificially or by a proper press forming machine into a conical shape corresponding to the flange seal surfaces $6a$, $7a$ (for example, as shown in FIG. 4) before use.

According to an experiment by the inventor, no particular difference was noted in compression characteristics and sealing performance by the presence or absence of preliminary forming, but when preliminarily formed pieces were used, the ease of fitting them on the seal surfaces $6a$, $7a$ and the sealing properties they exhibited when tightened at low pressure were further enhanced.

Figure 5:
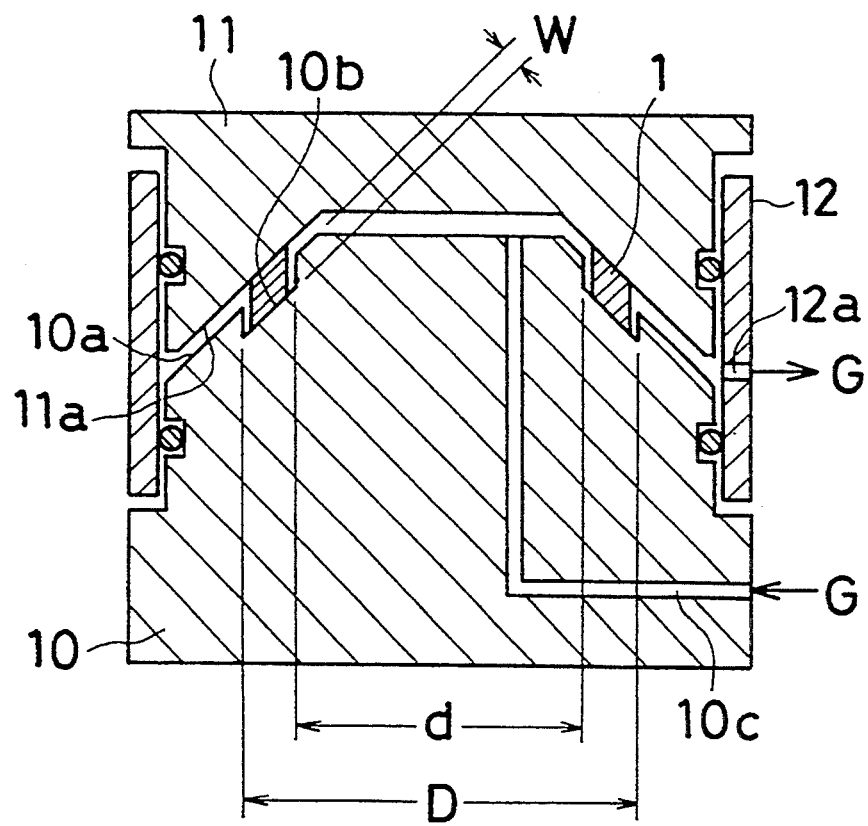
FIG. 5 is a sectional view showing an experimental apparatus.

In this experiment, as shown in FIG. 5, a pressing base 11 was supported on a foundation base 10 so as to be slidable vertically by means of a tubular frame 12. Conical surfaces $10a$, $11a$ forming an angle of 45 degrees were provided on the upper and lower confronting surfaces of the both bases 10, 11, and an annular groove $10b$, having a bottom with a slope of 45 degrees, was formed parallel to the conical surface $10a$ of the foundation base 10 (groove inside diameter d=43.1 mm, groove outside diameter D=58.3 mm, groove depth W=3.5 mm), thereby setting up the test apparatus. The invention pieces (gaskets) ①, ②, ③ (see FIG. 6) and a conventional piece were alternately put in the annular groove $10b$, and were pressed by the pressing base 11. In this state nitrogen gas G of 0.3 kgf/cm² was supplied into an inner region of each of the gaskets from a penetration route $10c$ formed in the foundation base 10, and leak gas at an outer region of each of the gaskets was recovered from a hole $12a$ in the tubular frame 12, and its volume (leakage) was measured. The invention piece ① was a vortex gasket forming a hoop made of a 6 mm wide SUS304 flat strip, and a flat filler of a 8 mm width comprising ceramic mixed sheet, having a flat form of 43.8 mm inside diameter, a 4.2 mm outside diameter, and a thickness of 8 mm in the radial direction. The invention piece ② was a vortex gasket forming the same hoop, and a flat filler of 8 mm wide flexible graphite sheet, having a flat form with a 3.8 mm inside diameter, a 54.1 mm outside diameter, and a thickness of 8 mm in the radial direction. The invention piece ③ was a vortex gasket preliminarily formed to have a 45-degree conical shape at both end faces (die forming with a forming pressure of 250 kgf/cm²). And the conventional piece was a traditional vortex gasket formed in a W-section in the width direction (43.5 mm in inside diameter, 57 mm in outside diameter, and 4.85 mm thickness in radial direction).

Figure 6:
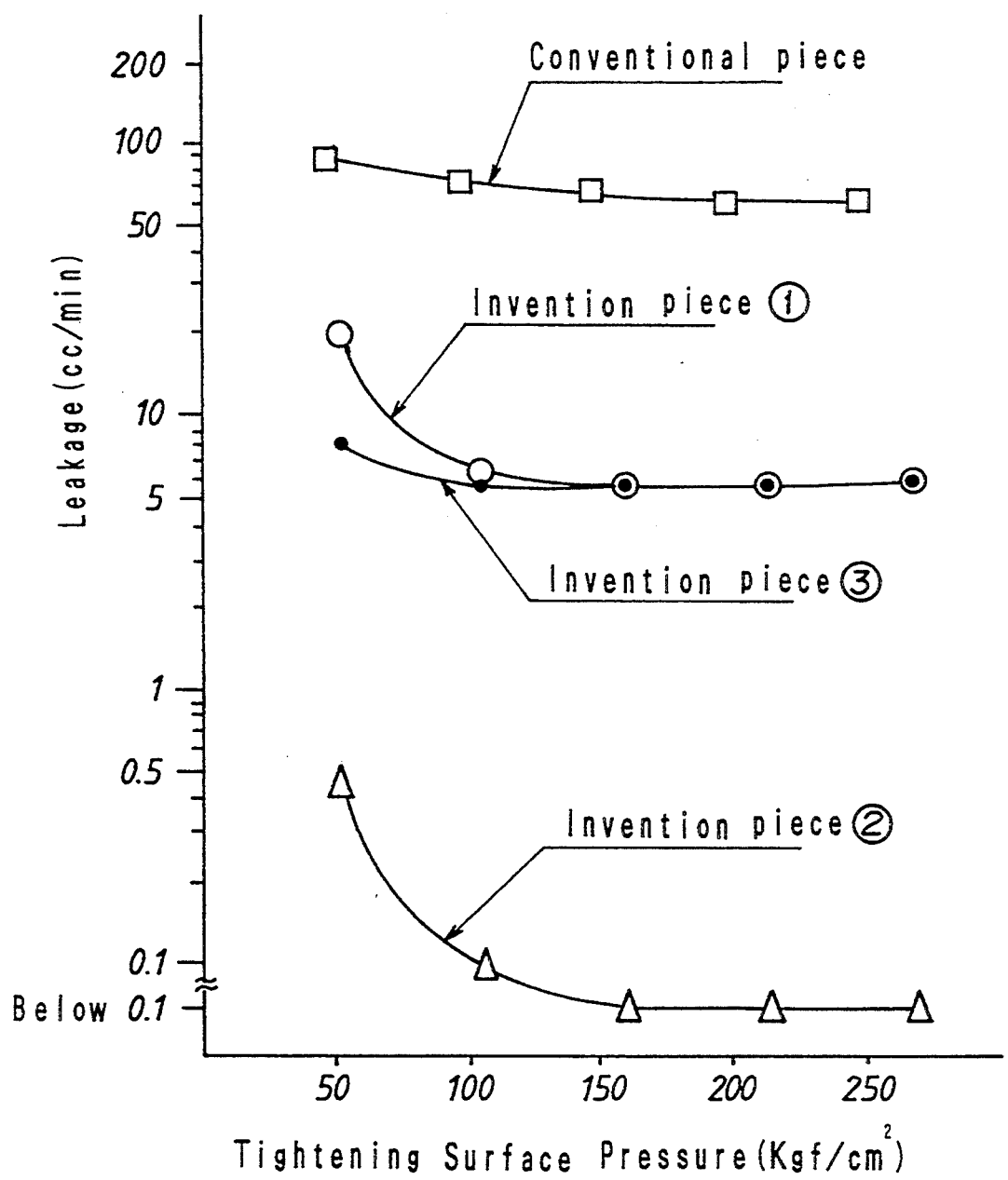
FIG. 6 is a graph showing results of an experiment.

The results of the experiment are as shown in FIG. 6, and, regardless of preliminary forming, the invention pieces ①, ②, ③ exhibited excellent sealing performances as compared with the conventional piece, and it is also known that the ease of fitting on the seal surfaces and sealing properties in low pressure tightening were further enhanced by the preliminary forming. In FIG. 6 ○ refers to the invention piece ①, △ to the invention piece ②, ● to the invention piece ③, and □ to the conventional piece. The tightening surface pressure (or seating stress) in FIG. 6 means the tightening pressure in the direction orthogonal to the conical surfaces $10a$, $10b$ applied to the vortex gaskets by the pressing force of the pressing base 11.

In the case of preliminary forming, the hoop 2 and the filler 3 may be retained in shape by using a temporary adhesive. Therefore, for example, if some impact is given during transportation, the preliminarily formed piece will not be broken apart. However, the adhesive should be properly selected depending on gasket properties and seal conditions, so as not to impede the deforming property, and fitting or sealing performance, in particular, when tightening the flanges.

The winding conditions (tightness, etc.) of the hoop 2 and filler 3 may be properly set depending on the seal surface shape and presence or absence of preliminary forming, and a further enhancement of sealing performance may be expected depending on the conditions.

Obvious changes may be made in the specific embodiment of the invention described herein, such modifications being within the spirit and scope of the invention claimed, and it is indicated that all the details contained herein are intended to be illustrative and not limiting in scope.

What is claimed is:

1. A vortex gasket for an automotive exhaust system comprising:

a spiraled metal hoop of flat strip material forming spiral loops revolving about an axis and having a hoop width in an axial direction;

a gasket filler tape of gasket material also arranged in spiral loops and being positioned between loops of said metal hoop so that the gasket filler tape overlays said spiraled metal hoop, said gasket filler tape having a tape width in said axial direction which is slightly greater than the hoop width, with side edges of the gasket filler tape extending in the axial direction beyond side edges of adjacent loops of the metallic hoop on both sides of the metallic hoop so as to position end faces of the gasket filler tape beyond the side edges of adjacent loops of the metallic hoop;

said vortex gasket having a conical shape with an innermost loop of the metallic-hoop and an innermost loop of the gasket filler tape being substantially axially displaced from an outermost loop of the metallic hoop and an outermost loop of the gasket filler tape and with intermediate loops thereof being axially displaced from said innermost and outermost loops to be graduated between said innermost and outermost loops in a conical fashion;

whereby said end faces of the gasket filler tape have conical shapes.

2. A vortex gasket as in claim 1 wherein the innermost loop of the metallic hoop is fixedly attached to the next outwardly-spaced metallic loop and the outermost loop of the metallic hoop is fixedly attached to the next inwardly-spaced loop of the metallic hoop.

3. A vortex gasket as in claim 2 wherein the gasket filler tape has a width which is not more than 1.5 times the width of the metallic hoop.

4. A vortex gasket as in claim 1 wherein the gasket filler tape has a width which is not more than 1.5 times the width of the metallic hoop.

* * * * *